United States Patent [19]
Pohl et al.

[11] 3,772,914
[45] Nov. 20, 1973

[54] APPARATUS FOR MEASURING TIME LAPSE BETWEEN BRAKE DEMAND AND APPLICATION

[75] Inventors: Wolfgang Pohl, Berenbostel; Dieter Luhdorff, Hannover, both of Germany

[73] Assignee: Westinghouse Bremsen-und Apparatebau GmbH, Hannover, Germany

[22] Filed: Oct. 30, 1972

[21] Appl. No.: 302,353

[52] U.S. Cl. .................................. 73/121, 73/39
[51] Int. Cl. ................................... G04f 9/06
[58] Field of Search .................. 73/121, 39, 128; 188/141

[56] References Cited
UNITED STATES PATENTS
3,088,311  5/1963  Dobrikin et al.................. 73/39

*Primary Examiner*—James J. Gill
*Assistant Examiner*—Anthony V. Ciarlante
*Attorney*—Ralph W. McIntire, Jr.

[57] ABSTRACT

An automatically calibrated test apparatus for determining the time required to attain a certain critical brake pressure following initiation of a brake application where the critical pressure is a predetermined percentage of the maximum brake pressure attainable. The critical brake pressure is calibrated and registered at a comparator device in response to an initial brake application following the release of which a subsequent application is made to start a timer and concurrently connect the effective brake application signal to the comparator for terminating the timer when the effective brake application signal matches the critical brake pressure signal registered during the initial brake application. A capacitor stores the maximum brake pressure signal generated by the initial brake application while a potentiometer calibrates the signal in accordance with a correction factor determined by said predetermined percentage.

7 Claims, 3 Drawing Figures

3,772,914

APPARATUS FOR MEASURING TIME LAPSE BETWEEN BRAKE DEMAND AND APPLICATION

BACKGROUND OF THE INVENTION

In the automative industry, especially where trucks or bus type vehicles are concerned, it is well known how to check pressure variations in the vehicle brake system relative to time, for the purpose of obtaining knowledge of the time required to achieve a certain critical brake pressure. Normally, electrical timing devices in the form of digital counters and the like are employed to show the time elapsed between the application of braking and the attainment of a predetermined brake pressure. Such time measuring devices require start and stop contacts, the former to indicate commencement of the timing period corresponding to the instant the brake application is made and the latter to indicate the end of the period indicative of the predetermined brake pressure being attained.

Since different vehicles may have different maximum brake pressures, it is self-evident that the predetermined brake pressure, which is generally regarded as a certain percentage of the maximum brake pressure, also varies from one vehicle to another. Consequently, the critical predetermined pressure must be selected prior to each time measurement operation by effecting a manual calibration of the pressure switch for each different predetermined pressure value. This manual calibration is not only time consuming, but can lead to errors in the time measurement due to inaccurate settings.

SUMMARY OF THE INVENTION

It is accordingly the principle object of the present invention to avoid the requirement of a manual claibration for different predetermined brake pressure values to be monitored in testing or checking the time required to attain the predetermined brake pressure following initiation of a brake application.

In the present invention, this is accomplished by including in a measuring device, a unit which automatically calibrates the predetermined brake pressure to be monitored for different vehicle braking systems whose maximum brake pressures differ. Since the predetermined brake pressure is normally considered to be a given percentage of the maximum brake pressure, a preset electronic compensating component in the form of a potentiometer is employed, which is subject to a voltage signal corresponding to brake pressure, as provided by a pressure to voltage transducer subject to the brake force applied. The potentiometer is adjusted to modify the maximum brake pressure signal, which is thence connected to a comparator device as a signal representative of a predetermined percentage of the maximum brake pressure available when maximum brake force is applied. A condenser between the comparator and the transducer serves to store the maximum voltage signal following release of an initial brake application that is intended to establish the predetermined critical pressure in accordance with the maximum brake pressure available.

A timing period is initiated in response to a subsequent application of brake force. A signal corresponding to the output of the transducer device is connected to the comparator for terminating the timing period when the buildup of brake pressure during the subsequent brake application corresponds to the predetermined brake pressure signal established during the initial brake application, thereby providing an indication of the time required to establish the predetermined braking pressure in a particular brake system.

Other objects and advantages of the present invention will become apparent from the following more detailed discussion when taken with the drawings in which.

Figure 1:
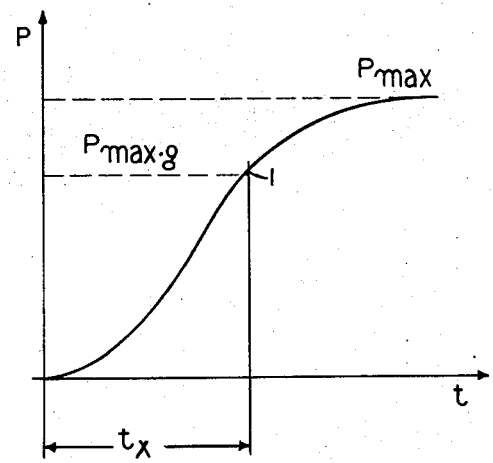
FIG. 1 shows a curve representing brake pressure versus time.

In the diagram of FIG. 1 is shown a vertical coordinate representing the pressure rise in a brake system and a horizontal coordinate representing time. A curve extending from the intersection of the coordinate to a level $P_{max}$ illustrates the pressure buildup in a brake system. Point 1 on the curve represents a critical pressure that is a predetermined percentage of the maximum pressure $P_{max}$. This pressure level is found by multiplying pressure $P_{max}$, which varies in different brake systems, by a constant correction factor $g$. The time tx required to obtain the critical pressure $P_{max} \cdot g$ is the time to be determined by the present invention.

Figure 2:
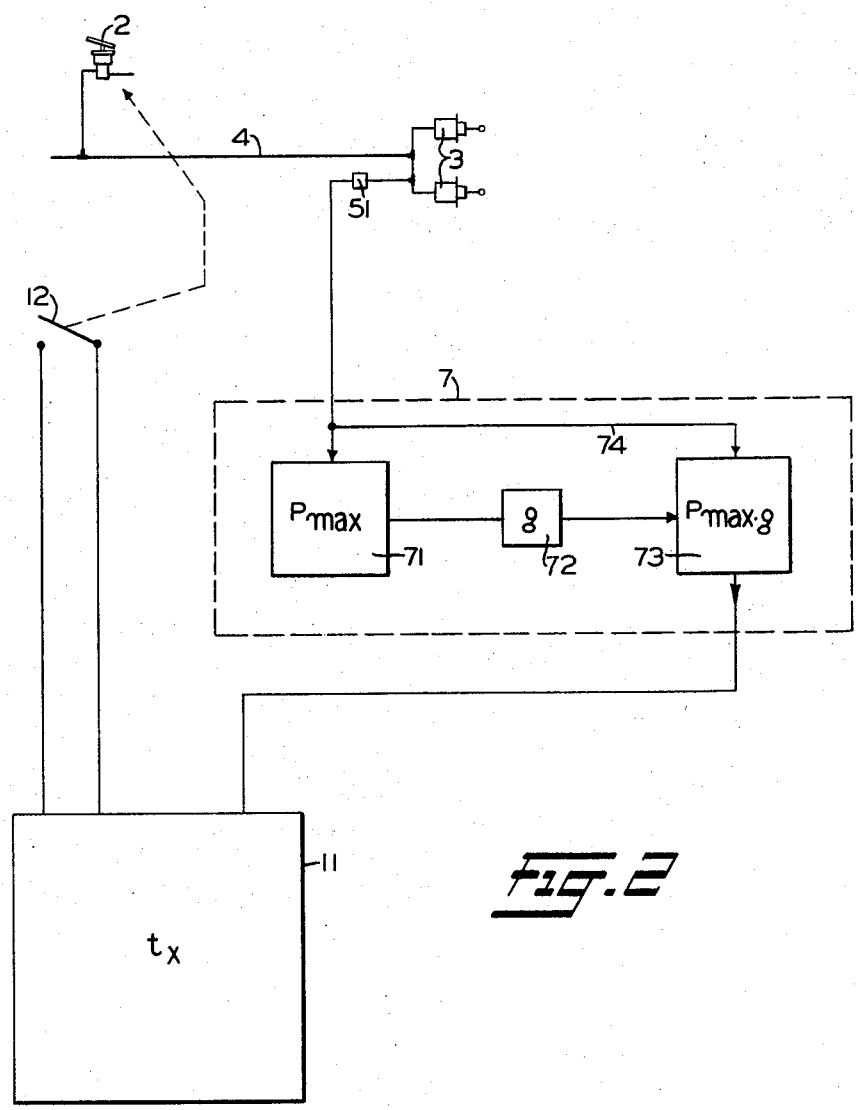
FIG. 2 shows a block diagram of a measuring device.

FIG. 2 shows a brake system to be tested, which is arranged with a timer device 11 and an automatic calibrating unit 7. As shown, a brake pedal 2 associated with a fluid pressure control valve device controls the supply of pnematic pressure to the wheel brake cylinders 3, only two of which are shown, via conduit 4. Connected to conduit 4 at the input of brake cylinders 3 is a pressure transducer 51, whose outlet is connected to a signal storing means 71 of calibrating unit 7, which also includes a comparator 73 and an electronic compensating unit 72 arranged between member 71 and comparator 73. The outlet of comparator 73 is connected to time device 11 to which a switch 12 associated with brake pedal 2 is also connected. Closure of switch 12 engages start contacts to initiate operation of timer device 11, while the output signal from comparator 73 engages stop contacts to terminate the timer.

The degree of depression of brake pedal 2 determines the degree of pneumatic pressure supplied to the brake cylinders 3. Accordingly, maximum depression of brake pedal 2 results in the brake cylinders 3 being supplied with maximum brake pressure $P_{max}$ for which the particular vehicle brake system is designed. This maximum brake cylinder pressure is also effective at transducer 51 where it is converted into a proportional voltage signal $V_{max}$.

Figure 3:
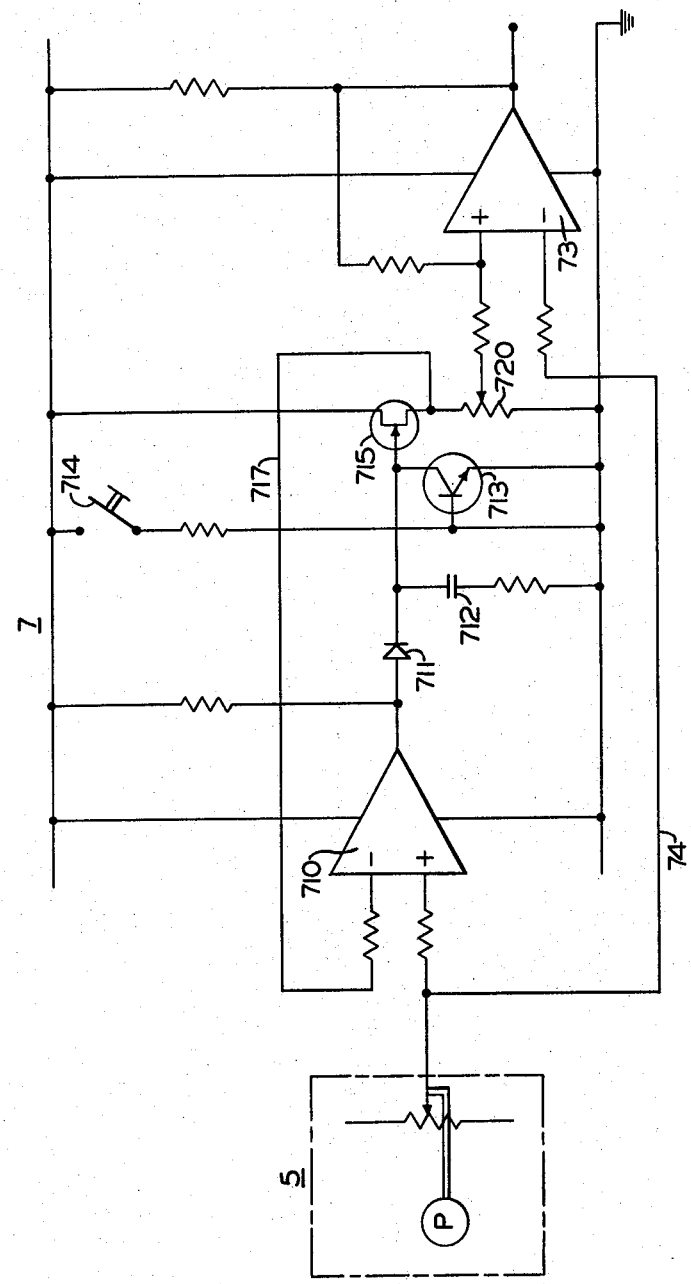
FIG. 3 shows a circuit diagrammatic of the automatic calibrating unit comprising the invention.

As shown in FIG. 3, the output of transducers 5 is connected in parallel to the positive input of an amplifier element 710 and via conduit 74 to the negative input of a comparison amplifier 73 of calibrating unit 7. In addition to amplifier 710, signal storing means 71 further includes a condenser 712 connected to the output of amplifier 710 via diode 711. Also connected to the output of amplifier 710 downstream of diode 711, so as to be subjected to the voltage potential to which condenser 712 is charged, is a field-effect transistor 715, whose output is connected to the positive terminal of comparison amplifier 73 via a potentiometer 720 comprising electronic compensating unit 72. Field-effect transistor 715 provides a high impedance load to condenser 712 to prevent a rapid rate of discharge of the consensor for a purpose hereinafter explained.

In order to register the critical pressure value which the test apparatus of the invention is intended to monitor for the purpose of determining the time required for the particular brake system to achieve said pressure, brake pedal 2 is first completely depressed to obtain a voltage $V_{max}$ at the positive terminal of amplifier 710 proportional to $P_{max}$. Accordingly, condenser 712 is charged to a value $V_{max}$. In order to compensate for the voltage drop across diode 711 and field-effect transistor 715, a feedback conduit 717 is connected from the output of field-effect transistor 715 to the negative input of amplifier 710 to adjust amplifier 710 so that the output of field-effect teansistor 715 reflects the output of transducer 5 with a total amplification of one.

At potentiometer 720, the output of field-effect transistor 715 is adjusted by the factor $g$ to obtain a signal max $\cdot$ $g$ at the positive input of comparator 73 corresponding to the value $P_{max} \cdot g$ shown in FIG. 1.

In accordance with a release of brake pedal 2, the transducer output voltage is removed so that there is no output emitted by amplifier 710. Condenser 712, however, remains charged at a value $V_{max}$ for some time due to amplification by field-effect transistor 715 and the fact that diode 711 prevents discharge via amplifier 710. In actual practice, it has been found that the registered value $V_{max} \cdot g$ is maintained for a period lasting from 4 to 5 minutes.

For the purpose of determining the time required to attain a critical brake pressure $P_{max} \cdot g$ in accordance with a brake application being initiated, brake pedal 2 is again activated, with transducer 5 converting the rising brake pressure P into a proportionately rising voltage V signal that is transmitted via conduit 74 to amplifier 73 for comparison with the previously registered critical pressure signal $V_{max} \cdot g$. Concurrent with actuation of brake pedal 2, switch 12 is closed to energize the start contacts associated with timer device 11 to initiate a timing period. When comparator 73 produces an output incident to signal V attaining a value corresponding to signal $V_{max} \cdot g$, the stop contacts of timer device 11 are engaged to terminate the timing period, the duration of which is thence indicated. This provides knowledge of the time required to attain a predetermined critical brake pressure following initiation of a maximum brake application, where the critical brake pressure is a given percentage of the maximum brake pressure attainable.

A transistor 713 is provided in parallel with condensor 712 to provide a discharge path when the transistor is turned on by closure of a manual switch 714 prior to a new test being performed. Where this new test is to be accomplished on a vehicle whose brake system produces a different maximum brake pressure, potentiometer 720 will be effective to automatically adjust the maximum brake pressure signal $V_{max}$ by a predetermined percentage to obtain signal $V_{max} \cdot g$ without requiring manual recalibration of the pressure transucer as previously required.

Having now described the invention, what we claim as new and desire to secure by Letters Patent, is:

1. Test apparatus for determining the time required for a brake system to develop a critical brake pressure predicated on a predetermined percentage of the maximum fluid brake pressure to which the brake actuator devices of said system are charged in accordance with operation of a control valve device thereof, said apparatus comprising:
   a. first means for providing an output signal representative of brake pressure effective at said actuator devices;
   b. an automatic calibrating unit subject to the output of said first means comprising:
      i. compensating means for modifying the output of said first means in accordance with a correction factor selected to provide a signal representative of said critical brake pressure when said control valve device is operated to provide said maximum brake pressure; and
      ii. comparator means subject to the output of said first means and said critical brake pressure signal for providing an output signal when correspondence therebetween occurs in accordance with said maximum brake pressure being released and subsequently reapplied; and
   c. timer means including start means operable concurrent with operation of said control valve device to initiate a timing period and stop means operable responsive to said comparator output signal to terminate said timing period when said critical brake pressure is attained.

2. Test apparatus, as recited in claim 1, wherein said compensating means comprises a potentiometer adjustable in accordance with said correction factor to provide said critical brake pressure signal.

3. Test apparatus, as recited in claim 1, wherein said calibrating unit further comprises:
   a. an electronic storage component subject to a first voltage signal corresponding to the output of said first means for storing a charge corresponding to the maximum brake pressure produced in accordance with initial operation of said control valve device; and
   b. a diode via which current flows to charge said storage component, said diode preventing loss of charge on said storage component when said first signal is dissipated during release of said brake pressure produced in accordance with initial operation of said control valve.

4. Test apparatus, as recited in claim 3, wherein said compensating means further comprises:
   a. a first amplifier operative responsive to the level of charge of said storage component to establish an output signal accordingly; and
   b. a potentiometer subject to the output of said first amplifier, said potentiometer being adjusted to provide an output which reflects the level of charge of said storage component as modified by said correction factor.

5. Test apparatus, as recited in claim 4, further characterized in that said first amplifier is a field-effect transistor in circuit with said storage component to provide a high impedance load for maintaining the level of charge of said storage component for an extended duration.

6. Test apparatus, as recited in claim 3, wherein said calibrating unit further comprises a manually activated transistor device in parallel with said storage component to provide a discharge path therefor.

7. A test circuit for determining the time required for a brake system to develop a critical brake pressure predicated on a predetermined percentage of the maximum fluid brake pressure to which the brake actuator devices of said system are charged in accordance with operation of a control valve device thereof, said apparatus comprising:
- a. transducer means for providing an output signal representative of brake pressure effective at said actuator devices;
- b. signal calibrating means in a first branch of said circuit comprising:
  - i. a capacitor subject to the output signal of said transducer for storing a signal corresponding to the maximum brake pressure developed;
  - ii. signal compensating means subject to said stored signal for modification thereof in accordance with a correction factor selected to produce a signal representative of said critical brake pressure when said control valve device is initially operated to provide said maximum brake pressure;
- c. comparator means having a first input for registering said critical brake pressure signal and a second input subject to the output signal of said transducer via a second branch of said circuit whereby said comparator means provides an output signal when said brake pressure reaches said critical brake pressure in accordance with a reapplication of brake pressure following release of said initial application of brake pressure; and
- d. timer means including start contacts engageable concurrent with operation of said control valve incident to said reapplication of said brake pressure to initiate a timing period and stop contacts engageable responsive to said comparator output signal to terminate said timing period when said critical brake pressure is attained.

* * * * *